United States Patent
Dally (10) Patent No.: US 11,835,266 B2
(45) Date of Patent: Dec. 5, 2023

(54) PANEL MOUNTING COMPONENTS

(71) Applicant: SUN AND STEEL SOLAR LLC, Stateline, NV (US)

(72) Inventor: Robert B. Dally, Stateline, NV (US)

(73) Assignee: SUN AND STEEL SOLAR LLC, Stateline, NV (US)

(*) Notice: Subject to any disclaimer, the term of this patent is extended or adjusted under 35 U.S.C. 154(b) by 545 days.

(21) Appl. No.: 17/079,289

(22) Filed: Oct. 23, 2020

(65) Prior Publication Data

US 2021/0041145 A1 Feb. 11, 2021

Related U.S. Application Data

(63) Continuation of application No. 16/363,294, filed on Mar. 25, 2019, now Pat. No. 10,845,092.

(60) Provisional application No. 62/733,085, filed on Sep. 19, 2018.

(51) Int. Cl.
*F24S 25/63* (2018.01)
*H02S 20/32* (2014.01)
*F24S 25/60* (2018.01)

(52) U.S. Cl.
CPC .............. *F24S 25/63* (2018.05); *H02S 20/32* (2014.12); *F24S 2025/6007* (2018.05)

(58) Field of Classification Search
CPC .. F24S 25/63; F24S 2025/6007; F24S 25/632; F24S 25/634; F24S 2025/80; H02S 20/32; F16G 11/00; F16G 11/105; F16G 11/106; Y10T 403/587; F16B 3/00
See application file for complete search history.

(56) References Cited

U.S. PATENT DOCUMENTS

| | | | |
|---|---|---|---|
| 1,665,360 A | 4/1928 | Gilbert | |
| 4,049,186 A | 9/1977 | Hanneman et al. | |
| 4,895,551 A | 1/1990 | Fritz | |
| 5,857,916 A | 1/1999 | Schoch et al. | |
| 7,137,897 B2 | 11/2006 | Kehrer | |
| 9,766,319 B2* | 9/2017 | Au | F24S 25/10 |
| 9,943,922 B2 | 4/2018 | Ishida et al. | |
| 2006/0054162 A1* | 3/2006 | Romeo | F24S 50/20 |
| | | | 126/600 |
| 2011/0101756 A1 | 5/2011 | Fassbender | |
| 2015/0200621 A1* | 7/2015 | Reed | F24S 25/636 |
| | | | 29/525.01 |
| 2017/0359017 A1* | 12/2017 | Corio | F16M 11/18 |
| 2019/0292823 A1 | 9/2019 | Dally | |

FOREIGN PATENT DOCUMENTS

SU 694241 A 5/1978

OTHER PUBLICATIONS

U.S. Non-Final Office Action for U.S. Appl. No. 16/363,294 dated Mar. 23, 2020.
U.S. Notice of Allowance for U.S. Appl. No. 16/363,294 dated Jul. 22, 2020.

* cited by examiner

*Primary Examiner* — Ko H Chan
(74) *Attorney, Agent, or Firm* — SHERMAN IP LLP; Kenneth L. Sherman; Steven Laut (57) ABSTRACT

A solar panel assembly includes a first torque tube and a mounting rail including a cutout portion that attaches to the first torque tube. The mounting rail including an upper portion configured for mounting multiple solar panels. The mounting rail establishes and maintains an electrical ground path from the solar panel assembly to the first torque tube.

19 Claims, 12 Drawing Sheets

PANEL MOUNTING COMPONENTS

CROSS-REFERENCE TO RELATED APPLICATIONS

This application is a continuation of U.S. patent application Ser. No. 16/363,294 filed on Mar. 25, 2019 that claims the priority benefit of U.S. Provisional Patent Application Ser. No. 62/733,085, filed Sep. 19, 2018, which are both incorporated herein by reference in their entirety.

TECHNICAL FIELD

One or more embodiments relate generally to devices for rotational panels, and in particular, rotational panel mounting rails and torque tubes.

BACKGROUND

Single axis trackers are mounting structures used for the controlled movement of photovoltaic solar panels and other solar collecting means from east to west to track the sun daily.

SUMMARY

Some embodiments provide panel mounting devices for supporting rotational panels. One embodiment provides a solar panel assembly includes a first torque tube and a mounting rail including a cutout portion that attaches to the first torque tube. The mounting rail including an upper portion configured for mounting multiple solar panels. The mounting rail establishes and maintains an electrical ground path from the solar panel assembly to the first torque tube.

These and other features, aspects and advantages of the one or more embodiments will become understood with reference to the following description, appended claims, and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to devices for rotational panels, and in particular rotational panel mounting rails and torque tubes. One embodiment provides a system including a first torque tube with a weld seam. A mounting rail includes a cutout portion with a weld seam alignment slot. The first torque tube is configured for placement in the cutout portion. The weld seam of the first torque tube is configured for placement within the weld seam alignment slot.

It should be noted that most conventional single axis trackers utilize a coupling mechanism to connect many load-carrying axle segments or torque tubes end-to-end to form an axle on which solar panels are mounted and rotated to track the sun in a single axis direction. All single axis trackers must have each of their electrically conductive parts electrically grounded to earth ground. The torque tube system is the main grounding trunk for collecting the ground from the metal frames of the attached solar panels, the solar panel mounting hardware, and the mounting posts or piers. Plastic bushings typically used within the bearing system electrically isolate the posts or piers from the torque tubes, necessitating a flexible grounding strap from each and every non-moving post or pier to the grounded, rotating torque tube system.

Conventional systems use conventional bearings, couplers, and grounding straps independently, constituting three distinct parts. Most conventional trackers utilize a torque tube coupling system for connecting torque tubes end-to-end that is separate and independent from the bearing, and located a distance away. This constitutes two distinct parts of the coupler and the bearing to perform two distinct functions. Some conventional systems use a shaft journal with a flange at each of the two ends of the shaft, each flange having a bolt hole pattern to connect a torque tube on either end, which also have similar flanges. This design adjoins two adjacent torque tubes to complete the torque tube axle system. This design, while utilizing a single part to perform the two functions of a simple bearing journal and a torque tube coupler, requires the addition of mating flanges onto the ends of the torque tubes.

Most conventional systems include a plastic sleeve as a bushing between the journal and the bearing to prevent metal-to-metal rubbing and thus increase the number of parts. The plastic bushing is electrically non-conductive and electrically isolates the metallic journal from the metallic bearing for preventing a ground path from each post to the torque tube and thus, requiring a separate, field applied, flexible ground wire between the post and the rotating, grounded torque tube (increasing the parts count). This ground strap must flex and survive approximately 22,000 flexes from the daily east to west rotation over a typical thirty year life span of a solar utility plant. This added ground wire at each and every post requires terminal studs to be attached, usually by field welding, to the posts and to the torque tubes at each post location, to function as terminals onto which the ground wires are to be attached. Note that the fabrication of the ground wire, the field welding attachment of the two studs at each and every post location, the cleaning of the weld-induced burned galvanization followed up with an application of zinc rich paint, followed by torque wrench tightening of the two ring terminals of the ground wire to the two studs incorporates much labor and much human and field condition variability that brings into question consistency, quality, durability, and reliability of those ground paths.

Most single axis trackers use a non-circular torque tube to hold the solar panels. The facets on those torque tubes allow a stronger grasp of the solar panels to the torque tubes, but have reduced torsional strengths than round torque tubes, and can be more expensive to fabricate than standard round tubes. The difficulty with round tubes is how to grasp on and hold that position without slipping if the wind were to reach a maximum design level. The usual fix is to add holding material to the round torque tubes, either in the form of discrete tabs, or raised tracks that run the full length of each torque tube, and to mount the solar panel rails onto these tabs. In the case of the discrete tabs, future replacement of solar panels requires that the same size of solar module be utilized, whereas a raised track offers the most flexibility to change solar panel sizes but comes with the cost of a lot of excess material only needed sporadically.

Conventional systems use round torque tubes, but remove a raised weld bead to meet standards for pipes and tubes. The conventional systems rely on friction alone to hold the solar panels to round torque tubes. Some embodiments rely on both friction and the raised weld bead to ensure a no-slip design. It is the combination of friction and a physical stop that optimizes the holding performance, preventing slipping or spinning, or if desired, not preventing but limiting the amount of slipping or spinning. This removes the cost of removing the weld bead and removes the cost of having to add tabs or a full-length holding key for solar panel rails. It also removes the cost of having to procure special tooling to shape the torque tube into a multi-faceted shape. Instead, some embodiments use standard tooling used for in-line continuous process of forming reels of flat stock into round pipe or round tube.

It should be noted that low prices for renewable energy mandate that cost savings be achieved in the material cost, the installation cost, and the operation and maintenance (O&M) cost. Material costs can be and are reduced by having fewer parts, which can be achieved by having one part to perform multiple functions. Accordingly, some embodiments: (a) provide a clamp-on solar panel mounting mechanism that reliably holds on to a round torque tube used on a single axis tracker; (b) provide a clamp-on solar panel mounting mechanism that relies on the round torque tube's seam weld to not be shaved down, but to remain as formed with a raised bead; and (c) provide a method of allowing the solar panel mounting and solar panels to a limited amount of slip, if desired to allow the solar panels to slip to a position that transmits less torsional force. Note that this configuration of relying on the naturally raised weld seam of a round torque tube: removes the need to remove the height of the seam's raised weld bead; removes the need to add any tabs or keys or raised tracks to the torque tube; and combines the strengths of both friction and blocking.

Material costs can be reduced by having simpler parts, which can be achieved by using standard off-the-shelf round tubing. Round tubing is the strongest shape, e.g. compared to square tubing, or octagon shaped tubing, and therefore achieves the required torsional strength with the minimal amount of steel. Round structural tubing is a very common product, thus special tooling is not required, it is easier to compete sources, and warehoused supplies can be found. For one or more embodiments, by simplifying the attachment by notching out the solar panel rail attachment to stop up against the round tube's raised weld bead formed when joining the seam of the shaped tube one achieves a lower cost and a higher reliability.

Some embodiments provide a specialized solar panel mounting rail that holds in formation multiple solar modules, and holds them in position on a round rotating torque tube even subject to winds reaching the upper velocity of the local code. Some embodiments provide: 1) a solar panel mounting system that fixes the solar panels into an array; 2) a solar panel mounting system that keeps the solar panels in alignment on the torque tube; 3) a solar panel mounting system that uses round torque tubes; and 4) a solar panel mounting system that establishes and maintains an electrical ground path. Multiple solar panels can be attached to multiple solar panel rails. The solar panel rails ensure that the solar panels remain in formation. The rails are mounted to the torque tube so that the solar panels are in the correct position. A gripping strength is provided that keeps the rails from turning when subjected to winds that produce a torsional force on the solar panels and hence the solar panel mounts. One or more embodiments ensure an electrical grounding path from the panel rails to the torque tube. A lowest cost of ownership may be obtained by using standard round tubes that yield the highest strength to cost ratio. One or more embodiments include a round torque tube that leaves the weld bead of the seam in place and protruding, fashion a panel rail onto which solar panels can be mounted in any number of ways, have that rail's interface to the torque tube be rough and sharp so that it bites into the torque tube to establish an electrical ground path, and fashion a small cutout in the panel rail's mating interface that fits over the seam weld bead on the round torque tube. One significant value of one or more embodiments is that the solar panels of the single axis tracking system can be easily disassembled and reworked if need be. Another advantage of this apparatus is that it reduces field assembly time and hastens the construction schedule because the solar panels can be pre-assembled off site or in a heated or airconditioned assembly area, staged onto a delivery vehicle, and quickly transferred to the torque tube a plurality of solar panels at a time.

Figure 1:
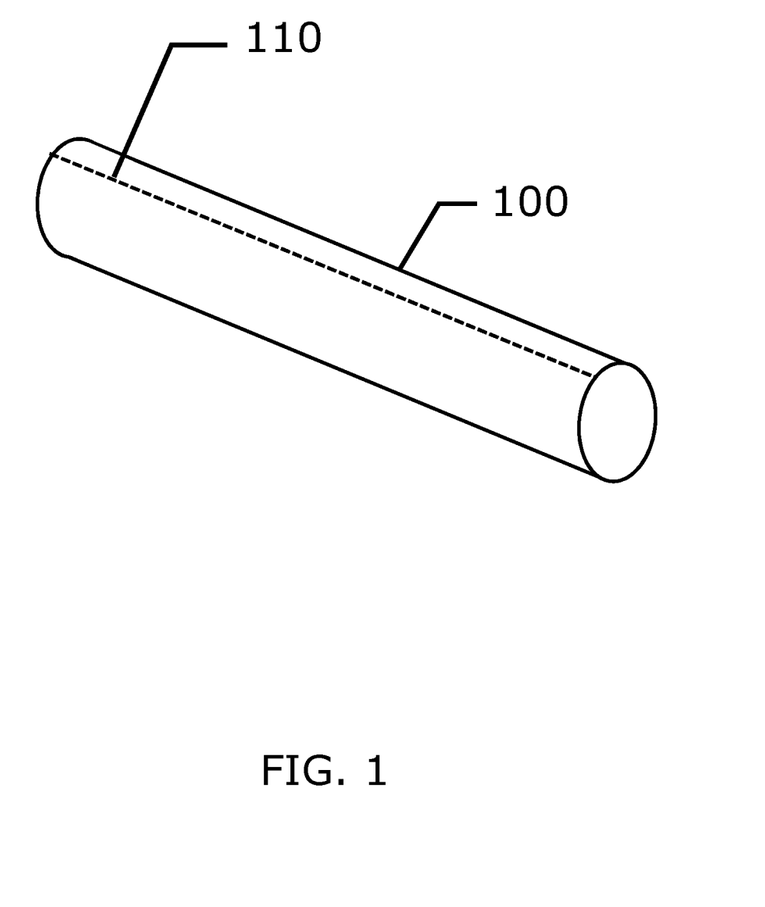
FIG. 1 shows a perspective view of a torque tube, according to some embodiments.
Figure 4:
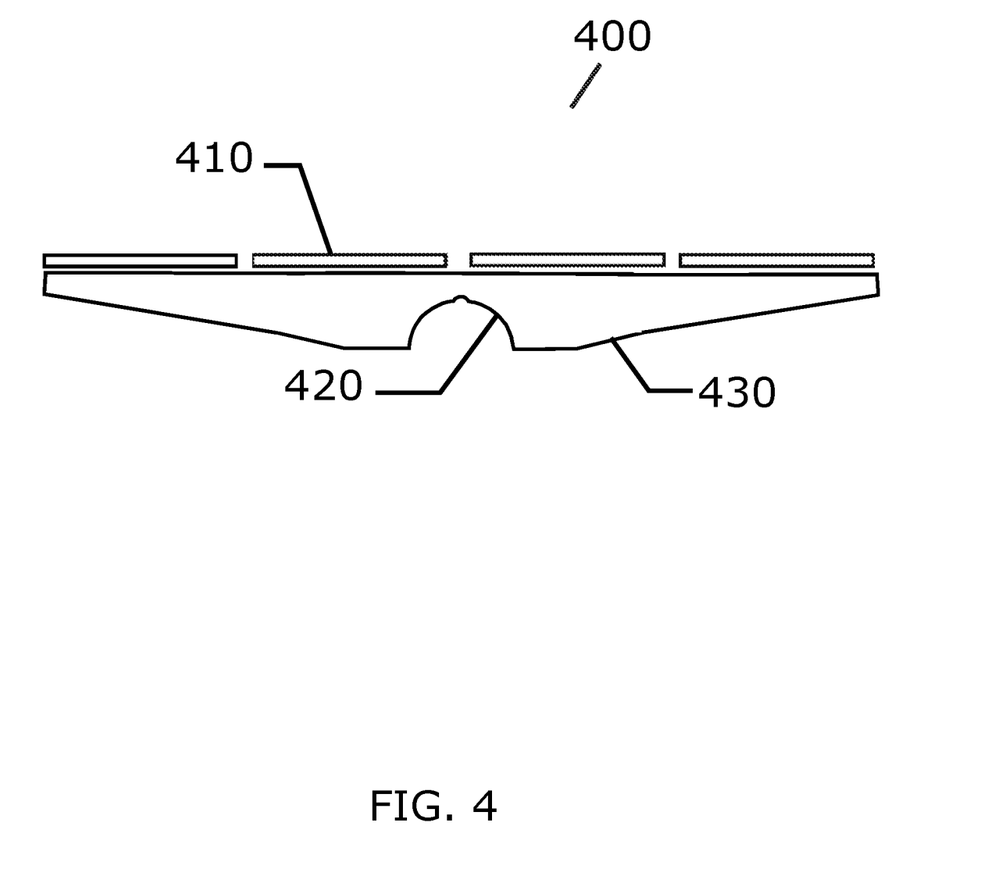
FIG. 4 shows a front view of a solar panel mounting rail with solar panels, according to some embodiments.

FIG. 1 shows a perspective view of a torque tube 100, according to some embodiments. Standard fabrication of round torque tubes or pipes involves forming flat stock into a round tube, and seam welding the butt joint, which leaves behind a raised seam weld that is removed with a lathe tool. In some embodiments, the torque tube 100 is formed from flat stock that is rolled into a round tube and the butting interface is seam 110 is welded along the full length of the torque tube 100. One or more embodiments leave the raised portion of the seam weld 110 without a lathing step, and use the seam weld 110 as a stop to prevent or severely limit potential slipping and turning of the solar panels (or modules) 410 (FIG. 4). Leaving the seam weld 110 in place provides a physical stop to prevent the solar panel mounting rail 400 (FIG. 4) from spinning when holding solar panels 410 and subjected to torsional forces caused by tilting, wind, or other forces which is necessary for single axis tracking systems used at solar photovoltaic power plants.

Figure 2:
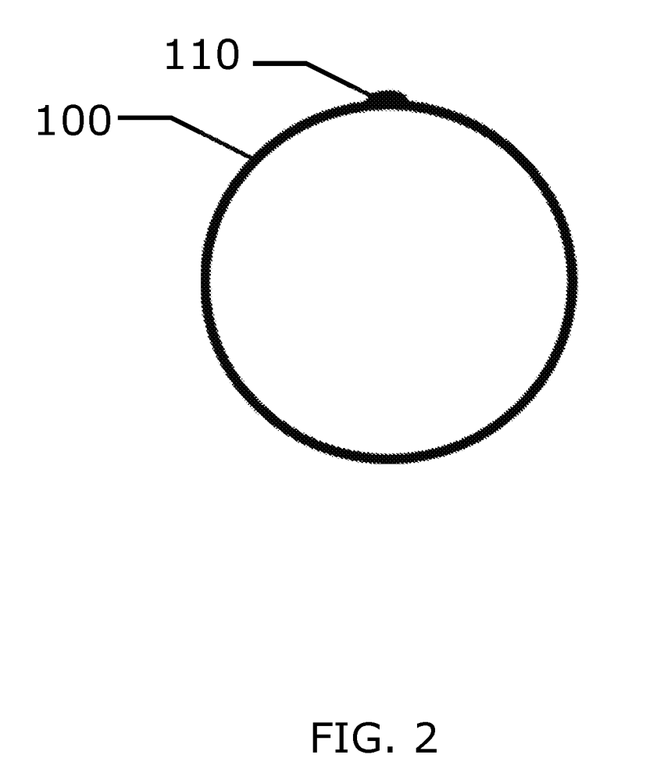
FIG. 2 shows a front view of the torque tube of FIG. 1, according to some embodiments.

FIG. 2 shows a front (or end) view of the torque tube 100 of FIG. 1, according to some embodiments. The seam weld 110 establishes a fully round torque tube 100. The bead of the seam weld 110 protrudes above the outer surface of the torque tube 100 and is not removed or reduced in height as is normally done in the pipe and tube fabrication process.

Figure 3:
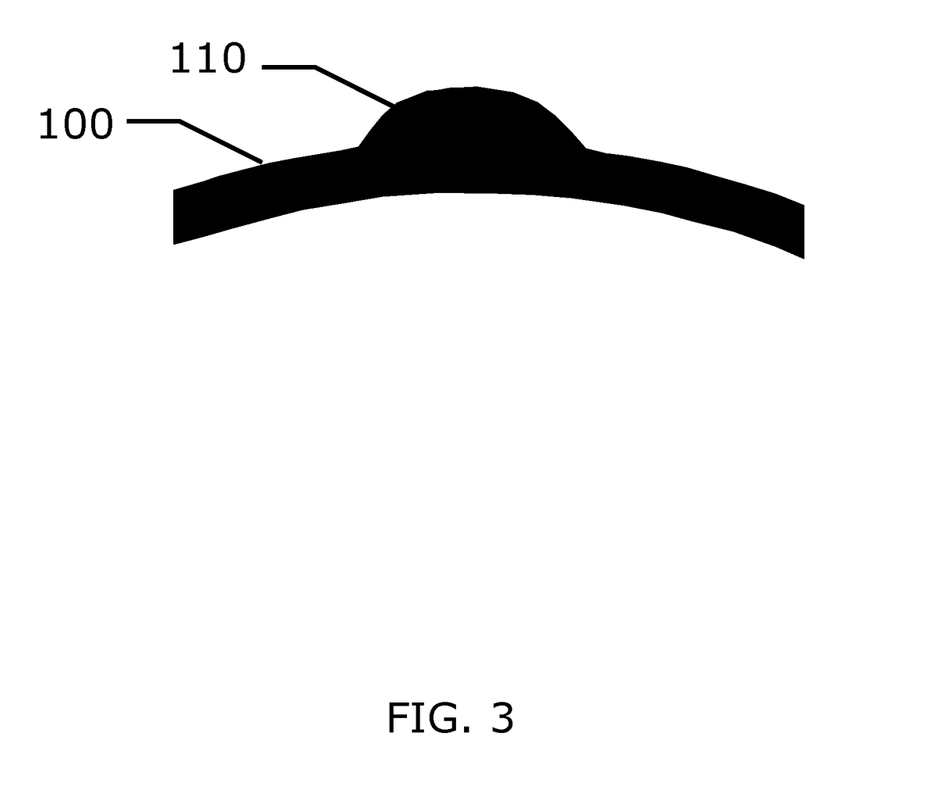
FIG. 3 shows an isolated view of a weld seam of the torque tube of FIG. 1, according to some embodiments.

FIG. 3 shows an isolated view of a weld seam 110 of the torque tube 100 of FIG. 1, according to some embodiments. In some embodiments, the seam weld 110 has a height in the range of 0.1-0.4 inches, preferably 0.2 inches, and a width in the range of 0.2-0.5 inches, preferably 0.3 inches.

FIG. 4 shows a front view of a solar panel mounting rail 400 with solar panels (or modules) 410, according to some embodiments. In one or more embodiments, multiple solar panels 410 are attached to two solar panel mounting rails 400. The solar panel mounting rail 400 includes a semi-circular cutout 420 in the center for mounting onto a round torque tube 100 (FIG. 1). In one or more embodiments, the solar panel mounting rail 400 includes supporting structure 430, which may be angled, contoured, rectangular, etc.

In one or more embodiments, the torque tube 100 is made of a light gauge metal structure and is placed within the semi-circular cutout 420 that fits half-way around the round torque tube 100 and holds tight against the torque tube with a nearly half-round strap 1100 (FIG. 11) on the opposite side of the torque tube 100 that is fastened to the device such that it cinches the pair against the round torque tube.

Figure 5:
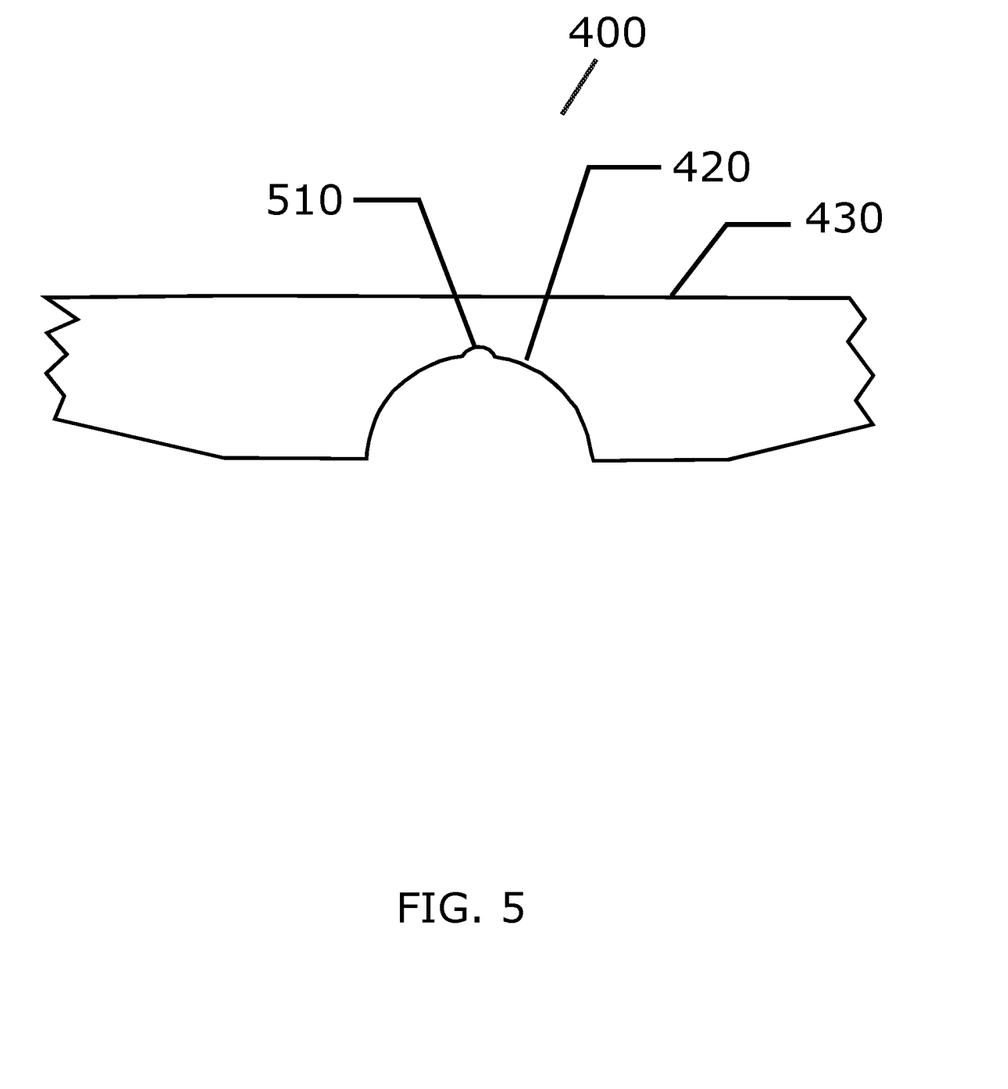
FIG. 5 shows an isolated view of a center portion of the solar panel mounting rail of FIG. 4, according to some embodiments.

FIG. 5 shows an isolated view of the center portion of the solar panel mounting rail 400 of FIG. 4, according to some embodiments. The semi-circular cutout 420 circular surface of the solar panel mounting rail 400 is rough, or jagged, to bite into the torque tube 100 (FIGS. 1-2, and 7-12), increases friction, adds a no-slip holding strength, and provides electrical ground continuity. The semi-circular cutout 420 has at its center point a smaller, somewhat semi-circular (e.g., semi-circular shape, oval, etc.) cutout (or weld seam alignment slot) referred to herein as a groove 510, and is just slightly larger than the protruding seam weld 110 (FIGS. 1-3) on the torque tube 100. The groove 510 fits over the seam weld 110 of the round torque tube 100 that positions the solar panel mounting rails 400 correctly as well as performing as the mechanical stop to prevent the solar panel mounting rail 400 from improperly turning on the round torque tube 100.

Figure 6:
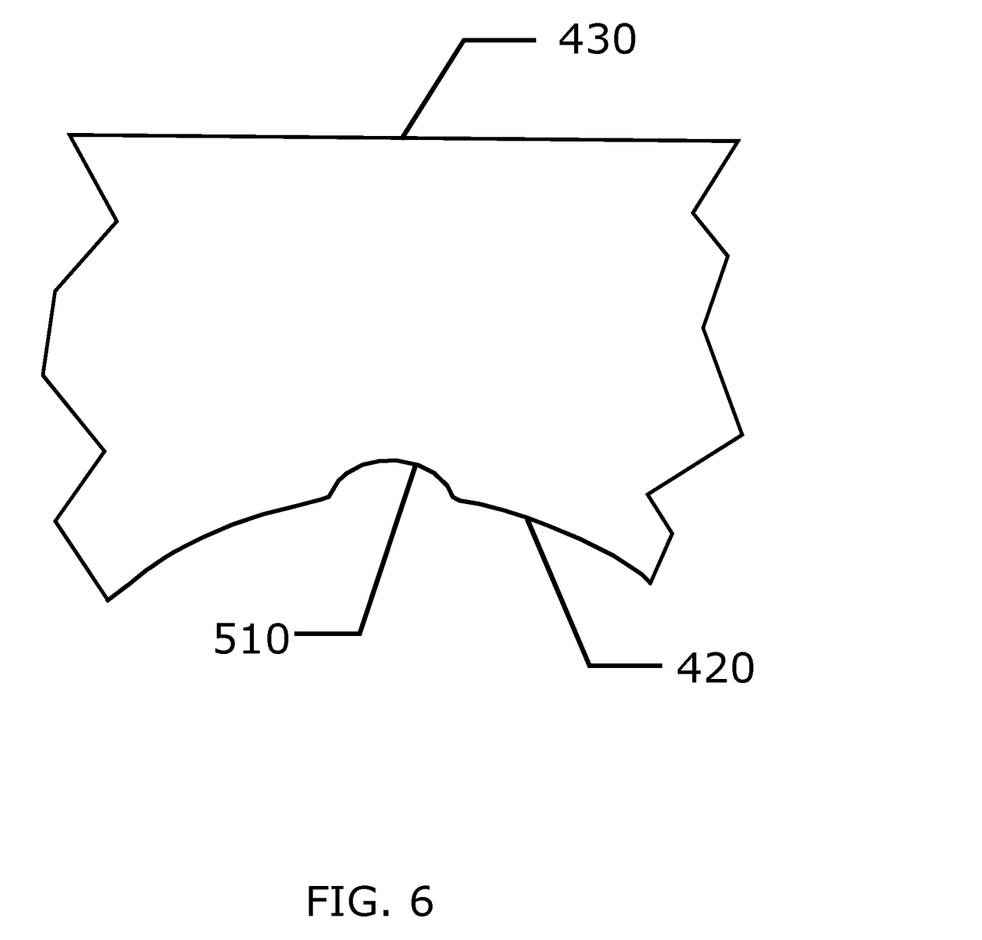
FIG. 6 shows a detailed view of the center portion of the solar panel mounting rail of FIG. 4, according to some embodiments.

FIG. 6 shows a detailed view of the center portion of the solar panel mounting rail 400 of FIG. 4, according to some embodiments. The groove 510 has a diameter just slightly larger than the weld bead 110 (FIGS. 1-3) and the larger semi-circular cutout 420 has a diameter equal to that of the torque tube 100 (FIGS. 1-3, and 7-12).

Figure 7:
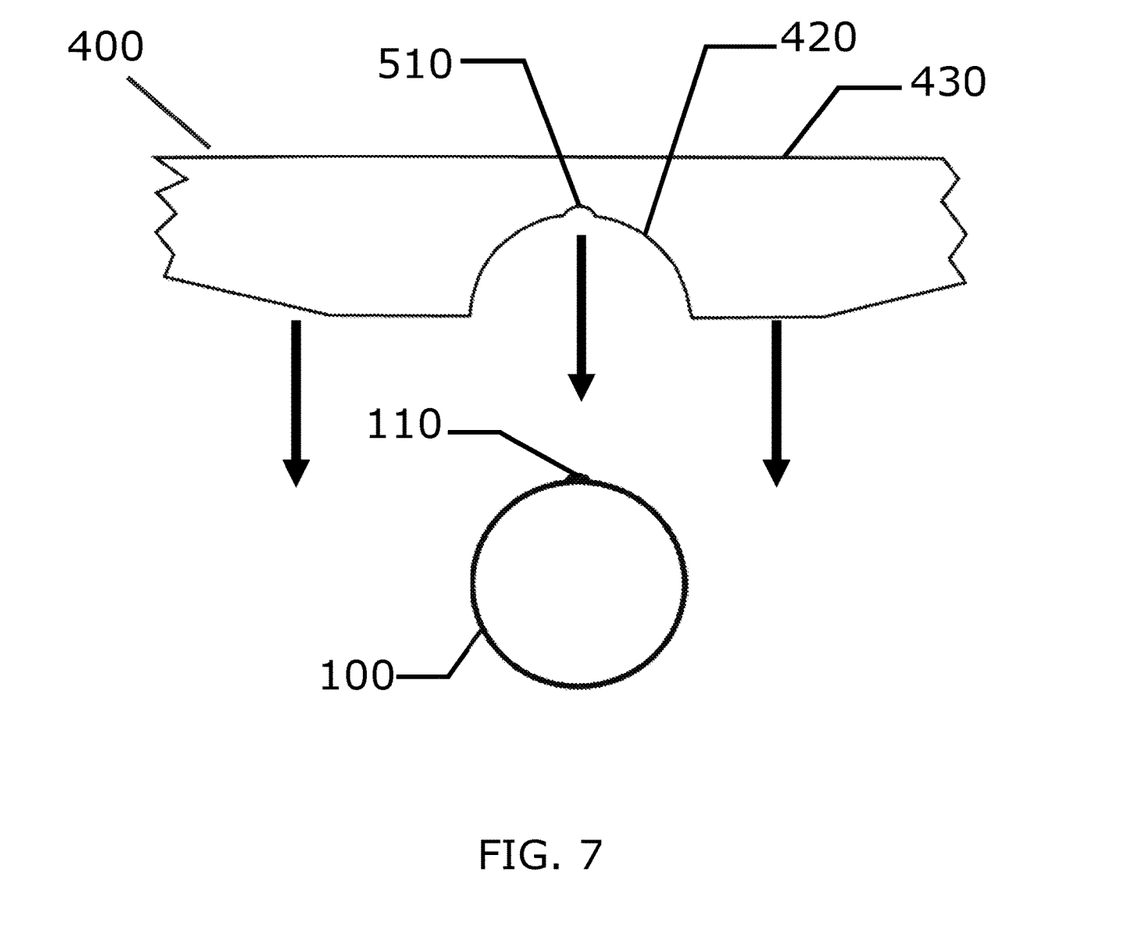
FIG. 7 shows a front view of a solar panel mounting rail being placed on a torque tube, according to some embodiments.

FIG. 7 shows a front view of a solar panel mounting rail 400 being placed on a torque tube 100, according to some embodiments. In one or more embodiments, the general guide is that the semi-circular cutout 420 slides over and down onto the same diameter torque tube 100 and centers itself as it comes to rest. To facilitate the process, the torque tube 100 should have its weld seam 110 on the top, and the torque tube 100 is not tilted left (counter-clockwise) or right (clockwise), so that the groove 510 fits right over the protruding weld seam 110 on the torque tube 100.

In some embodiments, the solar panel mounting rail 400 and torque tube 100 performs the multiple functions of: being a panel rail that assembles multiple solar panels (or modules) 410 (FIG. 4) to form a solar panel assembly; attaching the solar panel assembly (solar panel mounting rail 400 and solar panels 410) to a round torque tube 100 so that the solar panel assembly does not slip when subjected to design wind loads and tilted weight, and to establish and maintain an electrical ground path from the solar panel assembly to the torque tube 100.

Figure 8:
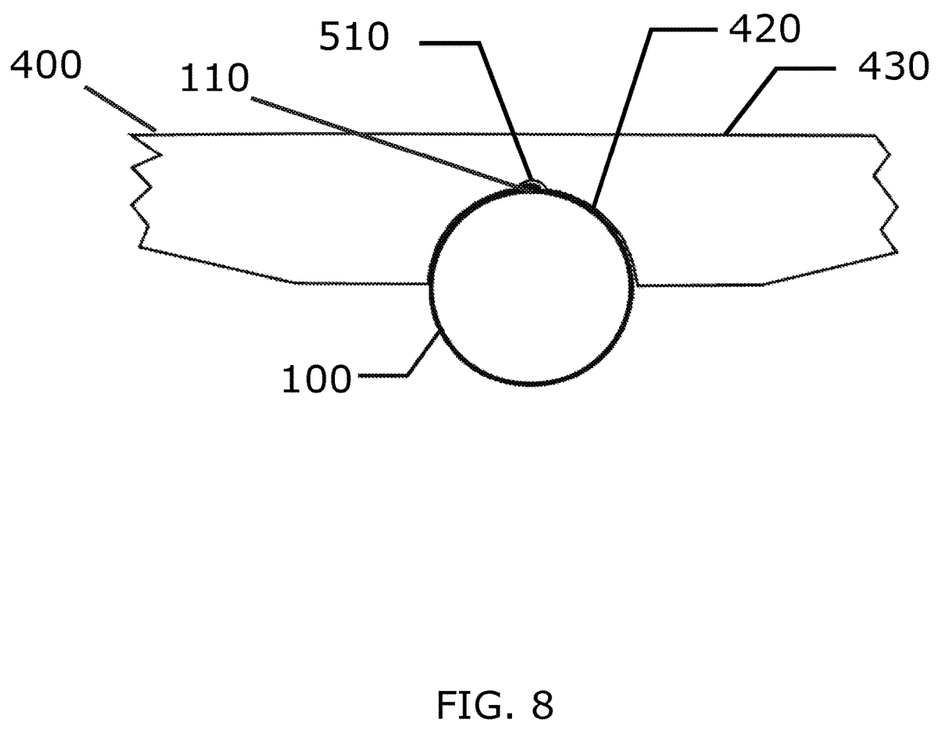
FIG. 8 shows a front view of a solar mounting rail placed onto a torque tube, according to some embodiments.

FIG. 8 shows a front view of the solar mounting rail 400 placed onto the torque tube 100, according to some embodiments. The semi-circular cutout 420 is in complete contact with the round torque tube 100 and alignment is established by ensuring that the groove 510 envelopes the weld seam 110 of the torque tube 100. In some embodiments, the solar panel mounting rail 400 has the semi-circular cutout 420 that fits snuggly onto half of the round torque tube 100. The interior surface of the semi-circular cutout 420 is rough so as to maximize the friction to the round torque tube 100.

Figure 9:
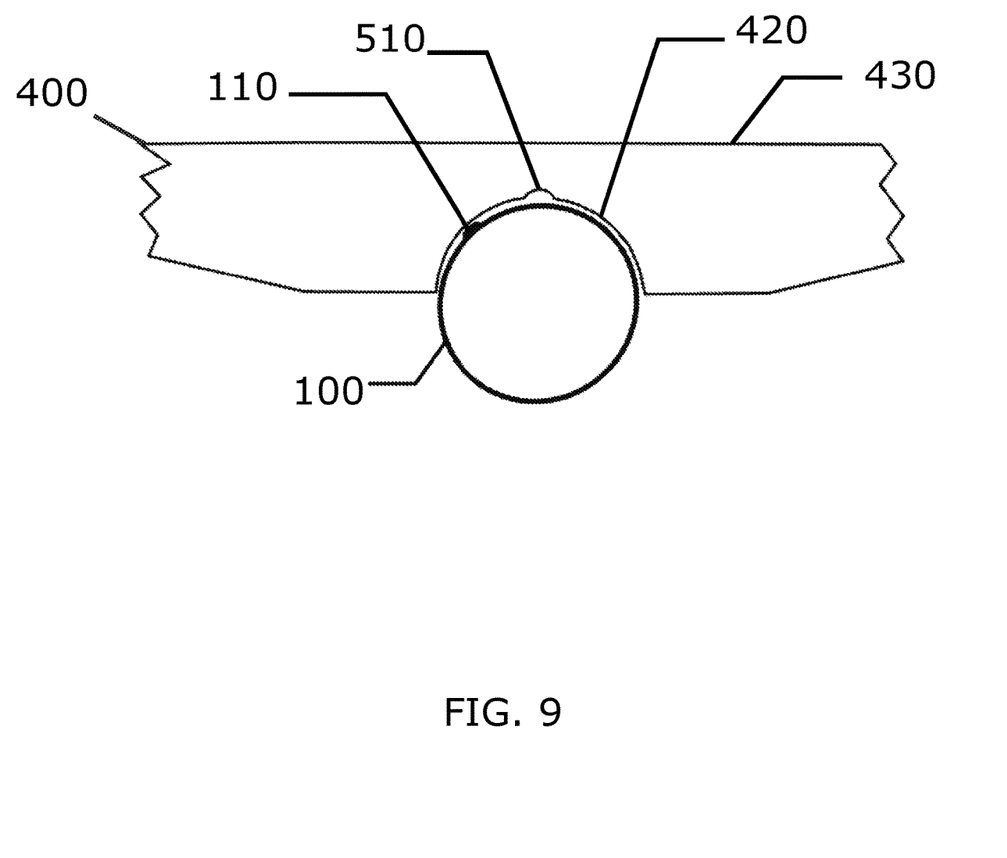
FIG. 9 shows a front view of a solar panel mounting rail incorrectly placed onto a torque tube, according to some embodiments.

FIG. 9 shows a front view of the solar panel mounting rail 400 incorrectly placed onto the torque tube 100, according to some embodiments. As shown, the torque tube 100 tilted to the left (counter-clockwise) such that the weld seam 110 is not top center but instead is several angular degrees off to the left such that as the solar panel mounting rail 400 rests in a zero tilt, the horizontal position of the groove 510 does not line up with the weld seam 110.

Figure 10:
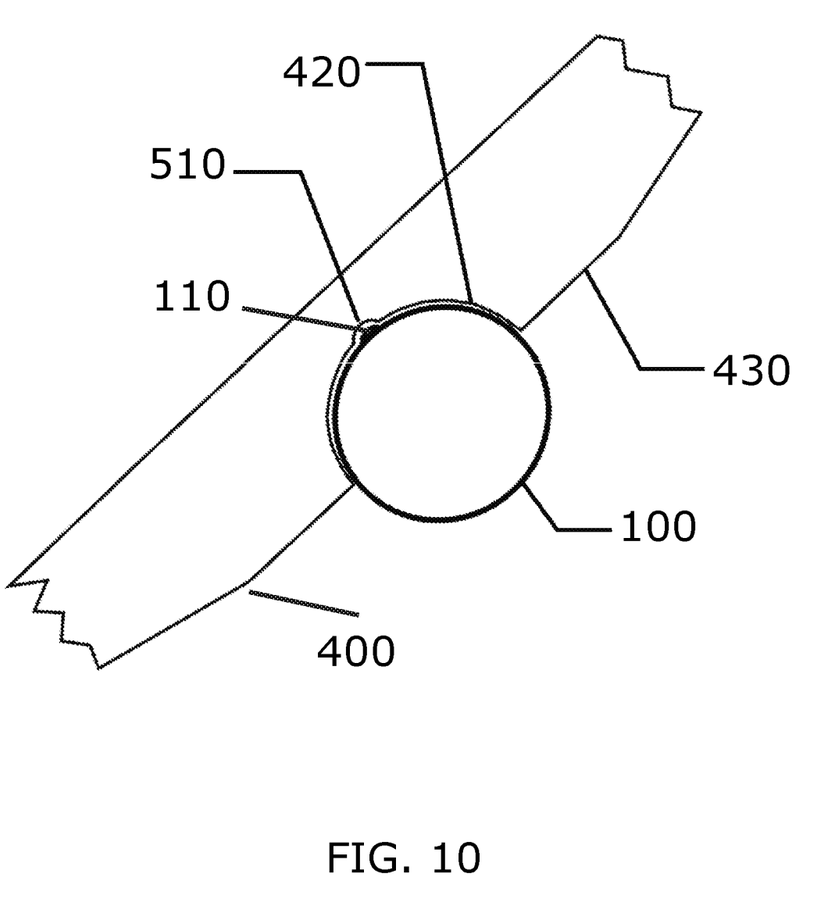
FIG. 10 shows a front view of a solar panel mounting rail placed onto a torque tube rotated in a first direction, according to some embodiments.

FIG. 10 shows a front view of the solar panel mounting rail 400 placed onto the torque tube 100 and rotated in a first direction (tilted left or counter-clockwise), according to some embodiments. As shown, the torque tube 100 is rotated to the left (counter-clockwise) such that the weld seam 110 within the groove 510 are coupled together offset from a top center position. The solar panel mounting rail 400 rests correctly when it is tilted the same amount and in the same direction as the torque tube 100.

Figure 11:
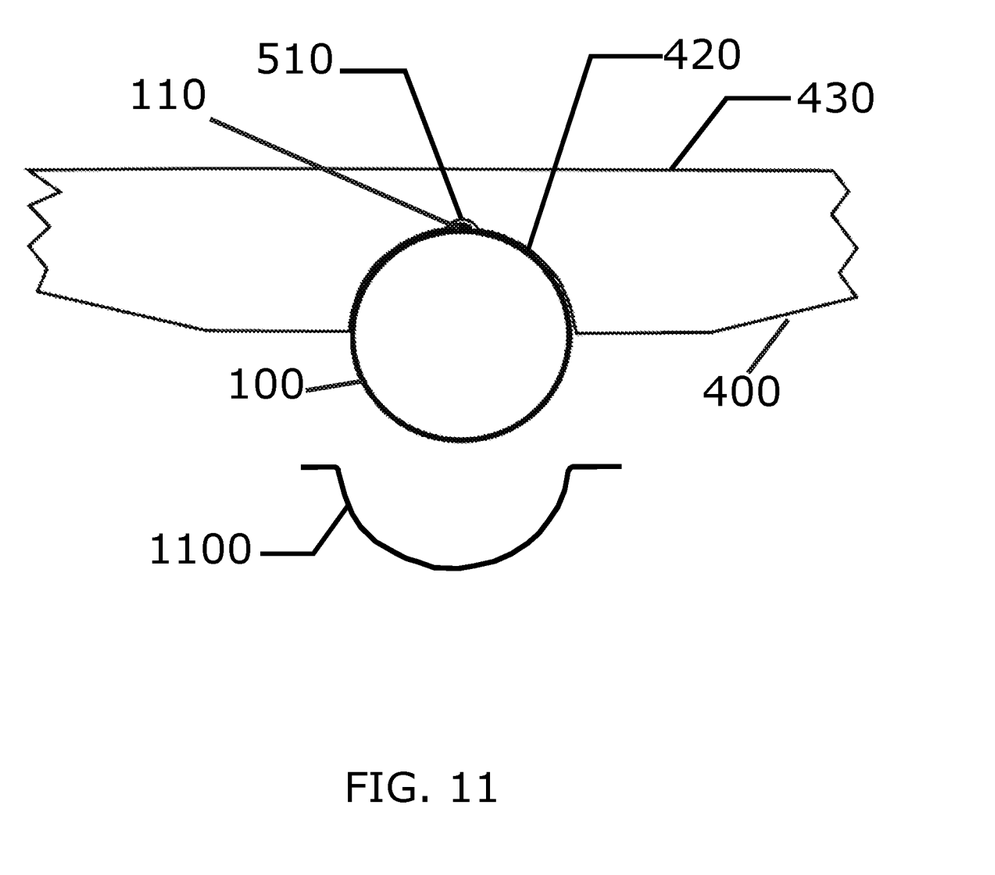
FIG. 11 shows a front view of a solar panel mounting rail placed onto a torque tube with a clamping strap in position to be cinched around the torque tube for fastening the torque tube with the solar panel mounting rail, according to some embodiments.

FIG. 11 shows a front view of the solar panel mounting rail 400 placed onto the torque tube 100 with a clamping strap 1100 in position to be cinched around the torque tube 100 for fastening with the solar panel mounting rail 400, according to some embodiments. In one or more embodiments, there are two fastener holes or through-hole on the bottom of the supporting structure 430 (e.g., for bolts, screws, set pins, etc.) to accept the nearly semi-circular strap 1100. In one example embodiment, two bolts with washer and nut hardware may be used to effectively cinch down the system of the solar panel mounting rail 400 and torque tube 100 with the strap 1100 against the round torque tube 100. The system holds multiple solar panels 410, both with and without frames, with attachment hardware and without using adhesives. In one or more embodiments, the groove 510 envelops the raised weld seam 110 along the length of the torque tube 100. For each solar panel mounting rail 400, the height increases from the outer edge towards the center to increase the bending strength as needed with the increasing bending moment.

Figure 12:
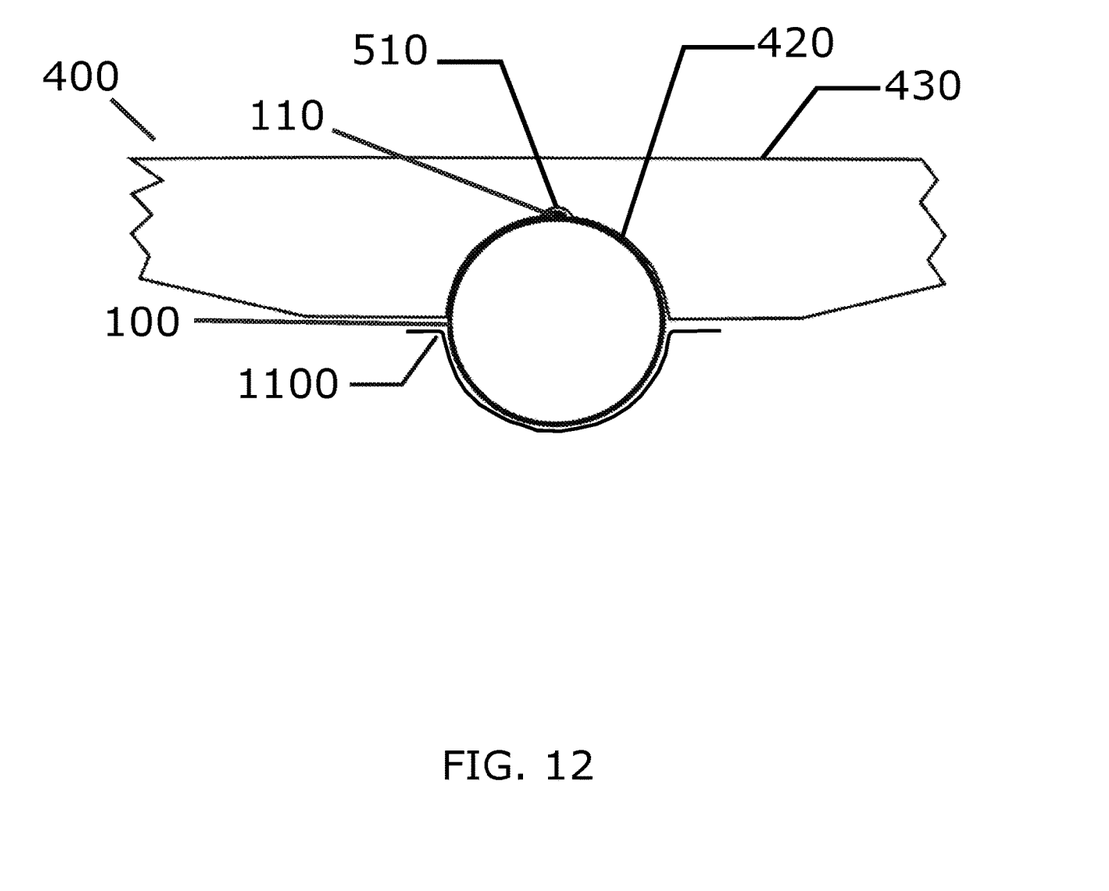
FIG. 12 shows a front view of a solar panel mounting rail placed onto a torque tube with a clamping strap attached to the solar panel mounting rail with a gap to ensure a clamping or cinching force when attaching hardware is tightened, according to some embodiments.

FIG. 12 shows a front view of the solar panel mounting rail 400 placed onto the torque tube 100 with the clamping strap 1100 attached to the supporting structure 430 of the solar panel mounting rail 400 with a gap to ensure a clamping or cinching force when attaching hardware is tightened, according to some embodiments.

Some embodiments include a method or process including placing a cutout portion (e.g., cutout portion 420, FIG.

5) of a panel mounting rail (e.g., panel mounting rail 400, FIGS. 4-12) onto a first torque tube (e.g., a torque tube 100, FIGS. 1-2, 7-8 and 10-12) including a first weld seam (e.g., weld seam 110, FIGS. 1-3, 7-8 and 10-12). The method further includes aligning the first weld seam with a weld seam alignment slot (e.g., groove 510, FIG. 5) of the cutout portion of the panel mounting rail. The method also includes attaching a plurality of solar panels (e.g., solar panels 410, FIG. 4) to an upper portion the panel mounting rail.

In one or more embodiments, the method further includes attaching a strap (e.g., strap 1100, FIGS. 11-12) to the first torque tube, and cinching the strap around the first torque tube and the panel mounting rail. In some embodiments, the placing of the cutout portion of the panel mounting rail onto the first torque tube including the first weld seam further includes placing of the cutout portion of the panel mounting rail onto a second torque tube (e.g., a torque tube 100, FIGS. 1-2, 7-8 and 10-12) including a second weld seam (e.g., weld seam 110, FIGS. 1-3, 7-8 and 10-12).

In one or more embodiments, the method further includes rotating the first torque tube and the second torque tube simultaneously with a solar tracker (e.g., a conventional solar tracker system that rotates the torque tubes clockwise and counter-clockwise for tracking the sun for maximizing solar energy collection for the solar panels during daylight).

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A solar panel assembly comprising:
   a first torque tube with a seam weld; and
   a mounting rail including a cutout portion that couples to the seam weld of the first torque tube, the mounting rail including an upper portion configured for mounting a plurality of solar panels;
   wherein the mounting rail establishes and maintains an electrical ground path from the solar panel assembly to the first torque tube.

2. The solar panel assembly of claim 1, wherein the mounting rail further comprises an angled support structure, and the cutout portion is semi-circular.

3. The solar panel assembly of claim 2, further comprising:
   a strap configured to cinch the first torque tube against the mounting rail;
   wherein the seam weld acts as a stop for prevention of the mounting rail from spinning due to torsional forces.

4. The solar panel assembly of claim 3, wherein the mounting rail is configured for rotating with the first torque tube.

5. The solar panel assembly of claim 4, wherein the first torque tube is coupled with a solar tracking system for rotating the first torque tube clockwise and counter-clockwise.

6. The solar panel assembly of claim 1, further comprising a second torque tube coupled with the first torque tube.

7. The solar panel assembly of claim 3, wherein the cutout portion fits half-way around the first torque tube and holds tight against the first torque tube with the strap positioned on a lower portion of the first torque tube.

8. The solar panel assembly of claim 7, wherein the strap fastens directly around the first torque tube and couples directly to a lower portion of the mounting rail.

9. A solar panel assembly comprising:
   a first torque tube with a first seam weld;
   a second torque tube with a second seam weld; and
   a panel mounting rail comprising a cutout portion and an upper portion that is configured for mounting a plurality of solar panels, wherein the first seam weld of the first torque tube and the second seam weld of the second torque tube are each configured for placement in the cutout portion, and the panel mounting rail establishes and maintains an electrical ground path from the solar panel assembly to the first torque tube and the second torque tube.

10. The solar panel assembly of claim 9, wherein the panel mounting rail further comprises an angled support structure, and the cutout portion is semi-circular.

11. The solar panel assembly of claim 9, further comprising:
    a strap configured to cinch the first torque tube against the angled support structure of the panel mounting rail;
    wherein the first seam weld and the second seam weld each act as a stop for prevention of the panel mounting rail from spinning due to torsional forces.

12. The solar panel assembly of claim 9, wherein the panel mounting rail is configured for rotating with the first torque tube and the second torque tube.

13. The solar panel assembly of claim 9, wherein the first torque tube is coupled with a solar tracking system for rotating the first torque and the second torque tube clockwise and counter-clockwise.

14. The solar panel assembly of claim 11, wherein the cutout portion fits half-way around the first torque tube and holds tight against the first torque tube with the strap positioned on a lower portion of the first torque tube.

15. The solar panel assembly of claim 14, wherein the strap fastens directly around the first torque tube and couples directly to a lower portion of the panel mounting rail.

16. A method for deployment of a solar panel system, the method comprising:
   placing a cutout portion of a panel mounting rail onto a seam weld of a first torque tube;
   attaching a plurality of solar panels to an upper portion of the panel mounting rail; and
   establishing and maintaining an electrical ground path from the plurality of solar panels through the panel mounting rail and to the first torque tube.

17. The method of claim 16, further comprising:
   attaching a strap to the first torque tube; and
   cinching the strap around the first torque tube and the panel mounting rail;
wherein the cutout portion is semi-circular;
   wherein the seam weld acts as a stop for prevention of the panel mounting rail from spinning due to torsional forces.

18. The method of claim 17, wherein the placing of the cutout portion of the panel mounting rail onto the first torque tube further comprises placing of the cutout portion of the panel mounting rail onto a second torque tube.

19. The method of claim 18, further comprising:
   rotating the first torque tube and the second torque tube simultaneously with a solar tracker.

\* \* \* \* \*